April 22, 1969 L. A. NIX, JR., ET AL 3,440,485

PPI DEFLECTION AMPLIFIER UTILIZING ENERGY RECOVERY

Filed Feb. 24, 1967

WITNESSES:

Bernard R. Gagne

James F. Young

INVENTORS

Lawrence A. Nix, Jr. and

Albin M. Surkovich.

BY Ernest P. Klipfel

ATTORNEY

United States Patent Office 3,440,485
Patented Apr. 22, 1969

3,440,485
PPI DEFLECTION AMPLIFIER UTILIZING ENERGY RECOVERY

Lawrence A. Nix, Jr., Ellicott City, and Albin M. Surkovich, Baltimore, Md., assignors to Westinghouse Electric Corporation, Pittsburgh, Pa., a corporation of Pennsylvania Filed Feb. 24, 1967, Ser. No. 618,453
Int. Cl. H01j *29/70, 29/76*
U.S. Cl. 315—27 10 Claims

ABSTRACT OF THE DISCLOSURE

A resonant energy recovery system for magnetic deflection apparatus used in conjunction with random access or PPI displays. The reactive power stored in the deflection yoke is fed to a storage capacitor whenever the energy level in the deflection yoke changes from a high value to a lower value resulting in a recovery of the energy which is later used as a boost voltage for the driver amplifier as opposed to dissipating the energy in the form of heat by means of damping resistors and/or other output means.

*Background of the invention*

Resonant energy recovery is well known to the display art for magnetic deflection systems which operate at a synchronous rate such as the periodic generation of a TV raster. For example, U.S. Patent No. 2,896,115 issued to Guggi describes a TV deflection circuit entitled, "A Retraced Driven Deflection Circuit," which operates on the energy recovery principle. A boost capacitor which is utilized in an energy recovery system for magnetic deflection circuits is shown in U.S. Patent No. 3,184,617 issued to R. F. Wood. Another boost circuit is also disclosed in U.S. Patent No. 3,229,150 issued to Greep.

The above-stated prior art systems, however, do not disclose apparatus which is particularly adapted to recover the reactive power stored in a deflection yoke of a PPI display or random access system. With increased writing speeds and reduced recovery times, the deflection power becomes very great. As the deflection signal changes from one given level to another, i.e., moving the trace from one posiiton to another, energy must either be added to or taken away from the deflection yoke. In the event that the energy in the deflection yoke of a PPI display must be reduced such as for example when moving a trace from a large distance away from the center of the display tube to a smaller distance, the energy in the yoke must be reduced. Since a large amount of power is involved, this energy is usually dissipated in the form of heat.

*Summary of the invention*

The subject invention is directed to an improved magnetic deflection system for a random access display or a PPI display and comprises a deflection amplifier including a transistor emitter follower circuit in the output for driving a push-pull deflection yoke, a transformer coupled in parallel to said yoke by means of diode switch means, and a storage capacitor coupled to the supply voltage powering the emitter follower. The transformer includes a winding which is coupled to the storage capacitor which may be referred to as the "boost" capacitor. Whenever energy in the deflection yoke is reduced, the fly-back voltage, produced as the magnetic field collapses, reverses in polarity whereupon the diode switch becomes operative and couples energy to the transformer. A charging current is produced and is fed to the boost capacitor by transformer action so that the capacitor recovers and reuses the energy for augmenting the supply voltage. Energy is thus reused instead of being lost as heat in the load for a given performance level.

*Description of the preferred embodiment*

Figure 1:
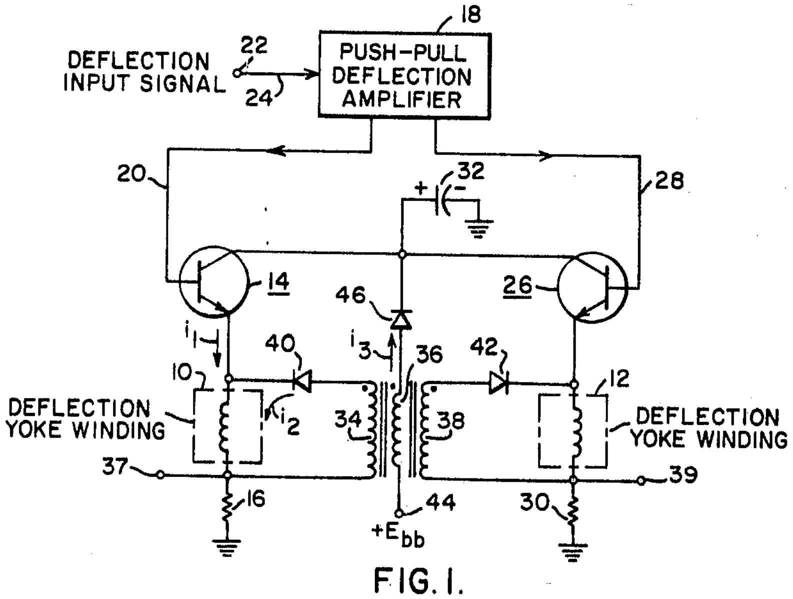
FIGURE 1 is an electrical schematic circuit diagram of the preferred embodiment of the subject invention.

Referring now to FIGURE 1 of the drawings, the preferred embodiment of the invention comprises a first and a second winding 10 and 12, respectively, of a push-pull deflection yoke for a magnetic deflection circuit for cathode ray tubes. Connected to one end of the first winding 10 of the deflection yoke is the emitter of an emitter follower circuit comprising transistor 14. The opposite end of the winding 10 is connected to a resistor 16 which has its opposite end connected to a point of reference potential illustrated as ground. The base of transistor 14 is coupled to a driving source comprising a push-pull deflection amplifier 18 by means of the circuit lead 20. The push-pull deflection amplifier 18 has a deflection input signal applied thereto at terminal 22 and circuit lead 24.

The other winding 12 of the deflection yoke is driven by means of an emitter follower circuit comprising transistor 26. Its base is coupled to the push-pull deflection amplifier 18 by means of circuit lead 28. One end of the deflection yoke 12 is coupled to the emitter of transistor 26 while the other end is coupled to the resistor 30 which is also returned to ground. The collectors of transistors 14 and 26 are commonly coupled to a storage or "boost" capacitor 32. A transformer having three windings 34, 36 and 38 is utilized with the push-pull yoke. More specifically, one end of transformer winding 34 is coupled to one end of the winding 10 of the deflection yoke by means of a semiconductor diode 40 while their respective opposite ends are directly connected to resistor 16 and terminal 37. With respect to the second half 12 of the deflection yoke, transformer winding 38 is similarly coupled thereacross by means of semiconductor diode 42. Terminal 39 is connected to common connection between windings 12 and 38.

Windings 34 and 38 are similarly poled with respect to the connection of diodes 40 and 42, as indicated by the polarity dots. The polarity dots are indicative of the ends of the windings which have the same instantaneous polarity. One end of the winding 36 is connected to a terminal 44 to which is applied a supply voltage plus $E_{bb}$ from a source not shown. The opposite end of the winding 36 is coupled to the boost capacitor 32 and the collectors of transistors 14 and 26 by means of a semiconductor diode 46. The diode 46 is poled to become conductive whenever the voltage across the boost capacitor 32 is less than $E_{bb}$ or when a positive voltage, with respect to the capacitor voltage, appears across winding 36.

In operation, when a deflection input signal is applied to the push-pull deflection amplifier 18, driving signals are translated through the emitter followers 14 and 26 to deflection windings 10 and 12, respectively of the deflection yoke to position the trace on a cathode ray tube display to a predetermined position. For example, assuming that there is no energy in the deflection yoke, at the occurrence of a deflection signal on circuit lead 20, a current $i_1$ will flow through the emitter of transistor 14 into the first winding 10 of the deflection yoke, as shown in FIGURE 1. The current flowing into the yoke will cause a magnetic field to be created which will then move the trace, not shown, a predetermined distance. Energy will be stored in the deflection yoke such that any reduction of the drive current $i_1$ will cause a collapse of the magnetic field in the yoke and a current $i_2$ will be induced if a closed circuit is provided. Inasmuch as the simiconductor diode 40 is poled such that it affords an easy current direction flow for $i_2$ but an open circuit for $i_1$, the energy stored in the deflection yoke 10 is dissipated by means of the current flow of $i_2$ which passes through the winding 34 of the transformer, as shown. As the current $i_2$ passes through the winding 34, a voltage is generated in winding 36 of proper polarity to cause a current $i_3$ to flow through the diode 46 to the capacitor 32. Another way of describing the action is as long as transistor 14 is conducting, energy will be transferred to the deflection winding 10. If transistor 14 is suddenly cut off, the yoke indutcance generates a large negative fly-back voltage at the cathode electrode of diode 40 which turns it "on." The energy stored in the yoke is then coupled to capacitor 32 by means of the transformer action of windings 34 and 36. The boost capacitor 32, moreover, will charge positively with respect to the supply voltage $E_{bb}$ supplied to terminal 44. This voltage serves as a boost voltage for the transistors 14 and 26 and therefore a smaller supply voltage can be used for a given operating speed. Terminals 37 and 39 provide means for obtaining a feedback voltage when desirable. Since the disclosed embodiment comprises a push-pull system, transistors 14 and 26 are alternately rendered conductive on successive half cycles of operation and energy is recovered for use thereof during mutually opposite half cycles. It can be seen that whenever winding 10 or 12 of the deflection yoke is driven from a high energy state to a relatively lower energy state, a fly-back voltage will be generated. This fly-back voltage is coupled to the transformer by means of the switch diodes 40 and 42 to produce a charging current $i_3$ for the capacitor 32.

Moreover, it is within the spirit and scope of the invention that the value of the capacitor 32 be chosen such that a resonant condition is produced with respect to the deflection yoke at the required recovery rate. Thus, the system will transfer energy from a first energy level to any position of a lower energy level at a very high speed. For positions corresponding to going from a lower energy level to a higher energy level, the system operates at a rate defined by the supply voltage $E_{bb}$ and the yoke inductance.

Figure 2:
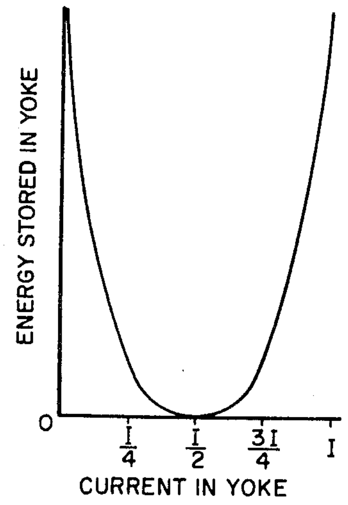
FIG. 2 is a diagram helpful in understanding the operation of the subject invention.

Referring now to FIG. 2, there is disclosed a diagram illustrative of the energy stored in each half of a push-pull magnetic deflection yoke such as utilized with respect to the embodiment shown in FIG. 1. The curve is drawn by plotting current through the yoke vs. energy stored. The energy is at a maximum when the current is equal to zero and I. This exists because the current will be maximum in one-half of the yoke while zero in the other half. Since the currents from the two halves of the yoke oppose each other in a push-pull system, energy stored in each half of the push-pull deflection yoke will be 0 for the condition where the currents are equal to I/2.

In summation, this invention comprises an energy recovery system for magnetically deflected cathode ray tube display. It provides a boost voltage as a result of the energy recovery process which provides extremely high speed operation. It provides speed advantages for any display system in which the number of beam position translations from a higher energy state to a lower energy state exceeds the number from the lower energy state to the high energy state. This is particularly adaptable for PPI displays or random access displays, for example, displays using stroke characters for page print.

Although the invention has been shown in connection with a certain specific embodiment, it will be readily apparent to those skilled in the art that various changes in the form and arrangements of parts may be made to suit requirements without departing from the spirit and scope of the invention. For example, the concept disclosed can be applied to single ended systems as well as other push-pull systems driven from any transistor or vacuum tube configuration.

What is claimed is:

1. Apparatus for magnetically deflecting the electron beam of a cathode ray tube display system comprising in combination: a push-pull magnetic deflection yoke; deflection amplifier means responsive to a deflection input signal for coupling electrical energy to said deflection yoke to position said electron beam at a predetermined location on a cathode ray tube display; transformer means having at least a first and a second winding; first circuit means including a diode switch coupling said first winding in parallel across said deflection yoke, said diode switch being poled to be rendered conductive when the driving energy from said driver means is reduced and a fly-back voltage is produced across said first winding; and electrical energy storage means coupled to said driver means and said second transformer winding being charged by said fly-back voltage to produce a boost voltage for said driver means.

2. The apparatus as defined in claim 1 wherein said energy storage means comprises a boost capacitor.

3. The apparatus as defined in claim 1 wherein said magnetic deflection yoke comprises a push-pull deflection yoke having a first and a second deflection winding.

4. The apparatus as defined in claim 3 wherein said transformer includes a third transformer winding and wherein said first circuit means couples said first transformer winding across said first winding of said deflection yoke, and which combination further includes second circuit means including a second diode switch coupling said second transformer winding across said second winding of said deflection yoke and third circuit means including a third diode switch for coupling said third transformer winding to said energy storage means.

5. The apparatus as defined in claim 4 wherein said energy storage means comprises a boost capacitor.

6. The invention as defined in claim 1 wherein said deflection amplifier means includes transistor amplifier means coupled to said second transformer winding, and circuit means for coupling a supply voltage to said transistor amplifier means through said secondary winding.

7. The apparatus as defined in claim 1 wherein said magnetic deflection yoke comprises a push-pull deflection yoke and said energy storage means comprises a boost capacitor which is charged by means of a current induced in said transformer means whenever said push-pull deflection yoke changes from a high energy to a low energy level.

8. The apparatus as defined in claim 1 wherein said magnetic deflection yoke includes a first and a second winding; said transformer means includes at least a third winding; said deflection amplifier means includes a push-pull deflection amplifier coupled to said first and said second windings of said deflection yoke for coupling electrical energy thereto; said energy storage means comprises a boost capacitor; said diode switch coupling said first winding of said transformer to said first winding of said deflection yoke and which combination further includes a second diode switch coupling said second winding of said transformer to said second winding of said deflection yoke, said first and said second diode switch additionally being poled to become conductive whenever energy in said deflection yoke is decreased from a higher level to a lower level; and circuit means coupling said boost capacitor to said deflection amplifier means and said third winding of said transformer means, said boost capacitor being charged by means of a voltage induced in said third winding whenever said energy in said deflection yoke decreases from a high energy level to a low energy level providing a boost voltage for powering said push-pull deflection amplifier.

9. The apparatus as defined in claim 8 wherein said push-pull deflection amplifier includes a first and a second transistor emitter follower coupled to said first and second windings, respectively, of said deflection yoke.

10. The apparatus as defined in claim 1 and additionally including means for coupling a supply voltage to said deflection amplifier means via said second winding of said transformer means and wherein said energy storage means comprises a boost capacitor adapted to be initially charged from said supply voltage and receiving an additional charge from said deflection yoke by the transformer action of said transformer means when said deflection yoke is driven from a high energy level to a lower energy level.

References Cited

UNITED STATES PATENTS

| | | | |
|---|---|---|---|
| 2,896,115 | 7/1959 | Guggi | 315—27 |
| 3,092,753 | 6/1963 | Steiger | 315—27 |
| 3,155,873 | 11/1964 | Paschal | 315—27 |
| 3,229,150 | 1/1966 | Greep et al. | 315—27 |
| 3,337,767 | 8/1967 | Munier de Montrichard et al. | 315—27 X |

RODNEY D. BENNETT, *Primary Examiner.*

C. L. WHITHAM, *Assistant Examiner.*